May 6, 1930.                E. BAGNALL                1,757,406
                           REFLEX SPRING
                          Filed Dec. 2, 1927
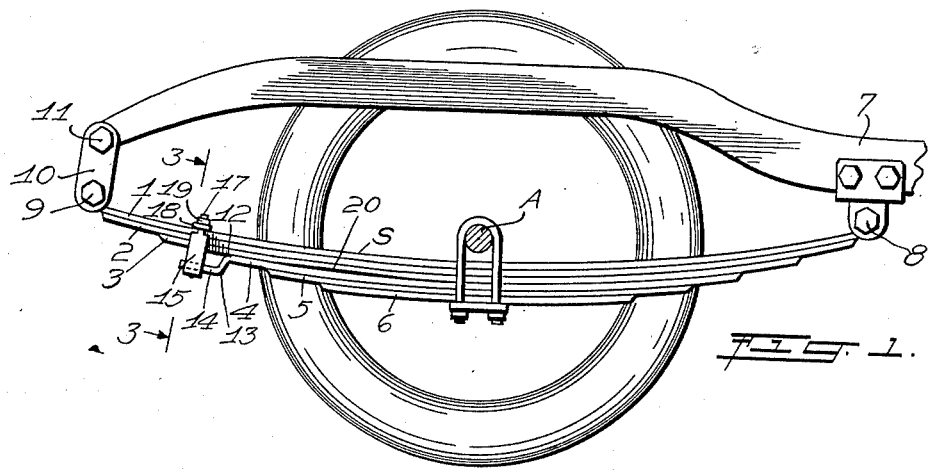
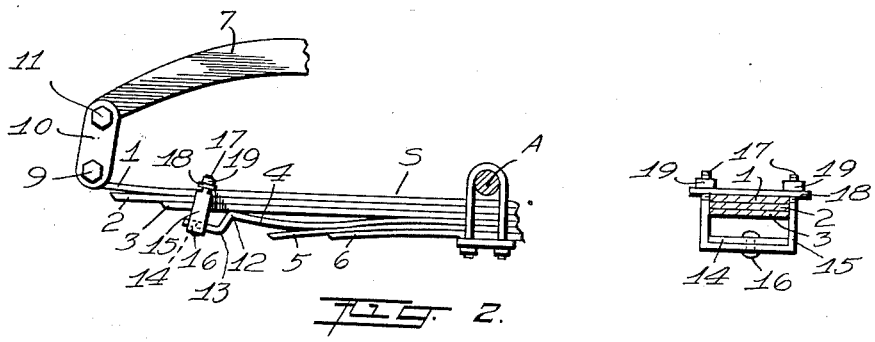
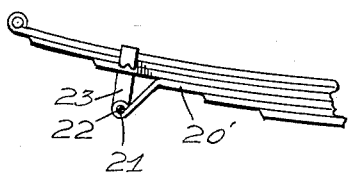
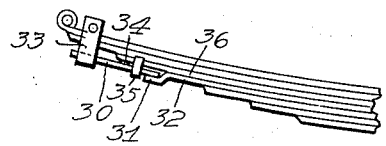
INVENTOR
E. BAGNALL
BY
ATTORNEY Patented May 6, 1930

1,757,406

UNITED STATES PATENT OFFICE

EDWIN BAGNALL, OF KENOSHA, WISCONSIN

REFLEX SPRING

Application filed December 2, 1927. Serial No. 237,269.

My invention relates to improvements in reflex springs, and it consists in the combinations, constructions, and arrangements herein described and claimed.

An object of my invention is to provide a device for reflexing a vehicle spring on the recoil, thereby dampening the spring action.

A further object is to provide a device for a vehicle spring comprising a series of spring leaves in which friction is increased between a portion of the leaves on the recoil and a reflex action is caused between another portion of the leaves, thereby eliminating any danger of spring breakage due to violent recoiling.

A further object of my invention is to provide a reflex spring in which the spring action on the down thrust of the vehicle is free, thereby providing a device which loses none of the easy riding qualities.

A further object is to provide a device in which one of the spring leaves in the vehicle spring acts as a fulcrum for dampening the spring action on the recoil.

A further object is to provide a device which is relatively simple in construction and durable and efficient for the purpose intended.

Other objects and advantages will appear in the following specification, and the novel features of the invention will be particularly pointed out in the appended claims.

My invention is illustrated in the accompanying drawings, forming part of this application, in which Figure 1 is a side elevation of my device as it would appear when attached to a vehicle spring, Figure 2 is a view showing the action upon a spring equipped with my device, Figure 3 is a sectional view taken along the line 3—3 of Figure 1, Figure 4 is a modified form of my device, and Figure 5 is a further modified form of my device.

In carrying out my invention, I make use of a vehicle spring S comprising a series of spring leaves 1, 2, 3, 4, 5 and 6. The spring S is secured to an axle A as shown in Figure 1. The spring in the present instance is of the semi-elliptic type and the leaves 1 to 6, inclusive, are of progressively different lengths, as shown in the drawings. In Figure 1, I have shown the spring S carried by the rear end of a vehicle frame 7. The forward end of the spring S is pivoted at 8 to the frame 7. The rear end of the spring is pivoted at 9 to shackles 10, which, in turn, are pivotally secured at 11 to the frame 7. The structure defined so far is old and forms no part of my present invention.

My invention in the present instance consists in the provision of the leaf 4 which is bent at 12 and again at 13 to form a lever 14. The portion 12 of the leaf 4 bears against the leaf 3 and acts as a fulcrum for the lever 14. A U-shaped clip 15 is secured to the lever 14 by the provision of a rivet or bolt 16. The clip 15 is provided with threaded shanks 17 for receiving a plate 18 which bears against the upper side of the leaf 1. Nuts 19 are disposed upon the shanks 17. The nuts 19 may be moved inwardly upon the shanks 17 so that the proper tension between the lever 14 and the leaves 1, 2 and 3 may be attained. Normally, the tension of the clip 15 is such that a slight space 20 is provided between the leaf 4 and the leaf 3.

From the foregoing description of the various parts of the device, the operation thereof may be readily understood. It will be seen that on the bound; that is to say, when the frame 7 is moved downwardly in the direction of the axle A, or, in other words, when the spring S is more or less straightened, my device does not influence the action of the spring. When, however, the vehicle and the frame 7 return on the recoil, it will be seen that the vehicle 10 will cause a sudden movement upwardly of the spring leaf 1. Since the plate 18 bears against the upper surface of the leaf 1, it is obvious that any movement of the leaf 1 will cause a relative movement of the lever 14. Referring to Figure 2, it will be seen during the recoil the lever 14 fulcrums at 12 so as to cause a reflex action of the leaves 5 and 6, thereby dampening the action of the spring. It will also be seen that the movement of the leaves 1, 2 and 3 is the reverse of the movement of the leaves 5 and 6, which also causes a dampening of the spring action.

The tension of the clip 15 may be easily attained by the adjustment of the nuts 19.

In Figure 4, I have shown a modified form in which a leaf 20 is formed with an eye 21 to receive a bolt 22 carried by a clip 23. In this device, however, the clip 23 is assembled with the spring under a tension. The operation, however, is the same as my preferred form.

In Figure 5, I have shown a further modification of my device. In this form, I have shown a lever 30 having one end carried between a portion 31 of a leaf 32 and a second leaf 36. A clip 33 supports one end of the lever 30. Any suitable lug 34 may be provided integral with the lever 30 for supporting the lever in its proper position. A U-shaped member 35 which is secured to the lever 30 and engages the spring prevents lateral movement of the lever.

I claim:

1. The combination of a vehicle spring comprising a series of spring leaves disposed in frictional engagement with each other, one of said leaves being formed to provide a lever and a fulcrum for the latter, and means secured to the lever and engaging a portion of said spring leaves for causing a reflex action when said spring recoils.

2. The combination of a vehicle spring comprising a series of spring leaves disposed in frictional engagement with each other, one of said leaves being formed to provide a lever and a fulcrum for the latter, and a clip secured to the lever and arranged to bear against the top of said spring, said clip being arranged to cause the lever to fulcrum against a portion of said spring leaves for causing a reflex movement of a portion of the leaves, thereby dampening the spring action on the recoil.

3. The combination with a vehicle frame and a vehicle spring pivotally mounted to said frame, said spring comprising a series of progressively shorter spring leaves, one of said spring leaves being formed to provide a lever and a fulcrum for the latter, and means actuated by the lever and engaging a portion of the spring leaves for causing a reflex action.

4. The combination with a vehicle frame and a vehicle spring pivotally mounted to said frame, said spring comprising a series of progressively shorter spring leaves, one of said spring leaves being formed to provide a lever and a fulcrum for the latter, a clip secured to the lever, said clip being provided with threaded extensions, means disposed upon the threaded extensions and engaging a portion of the spring leaves, and means arranged to move said last-named means for increasing or decreasing the tensional relation between the clip and a portion of the spring leaves.

5. In a vehicle spring, an intermediate leaf having its end arched, combined with an adjustable clamp adapted to compress the arch on the adjacent leaf.

6. In a vehicle spring the combination of an intermediate leaf of a leaf spring having an arched end with an adjustable clamp adapted to press the arch towards the main leaf.

7. In a vehicle spring, a shock absorber, part of which forms a part of an intermediate leaf of the spring in combination with an adjustable clamp, adapted to clamp said part to the main leaf.

8. In a leaf spring, a plurality of spring leaves, one of which has extensions at the ends thereof designed to form auxiliary spring bows, and means for placing said bows under compression to thereby yieldingly urge the adjacent surfaces of the remaining spring leaves into contact with each other.

9. A vehicle spring comprising a main leaf and a plurality of shorter leaves, one of said shorter leaves being offset near one end in a direction away from said main leaf, a saddle engaging the remote side of said main leaf opposite said offset, link means for joining said saddle and said offset end, and means for adjustably regulating the effective length of said link means.

10. A vehicle spring comprising laminated leaves, a clamp embracing the longer leaves adjacent the spring end, one of the leaves being bowed in the clamp, and means carried by the clamp for adjusting the tension of the bowed portion.

11. A spring having a shock absorbing element integral with a part of the spring and superimposed over a portion of the spring and a clamp element superimposed over a portion of the spring and over a portion of the shock absorbing element.

12. A spring having a shock absorbing element integral with a part of the spring and superimposed over a portion of the spring, a clamp element superimposed over a portion of the spring and over a portion of the shock absorbing element, and means for adjusting said clamp element to vary the tensional relation between the spring and the shock absorbing element.

13. A spring having a shock absorbing element formed on a part of the spring and superimposed over a portion of the spring and means for adjusting the tensional relation between the spring and the shock absorbing element.

14. A spring having a shock absorbing element formed on a part of the spring and means for adjusting the tensional relation between the spring and the shock absorbing element.

15. A leaf spring provided with a supplemental resilient member having contacting portions and outwardly disposed noncontacting portions, and means for tightening said portions towards the spring.

Signed at Chicago, in the county of Cook, and State of Illinois, this 25th day of November, A. D. 1927.

EDWIN BAGNALL.